(12) United States Patent
Tsuchihashi et al.

(10) Patent No.: US 9,125,340 B2
(45) Date of Patent: Sep. 8, 2015

(54) RIDE-ON LAWN MOWER (71) Applicant: Kubota Corporation, Osaka (JP)

(72) Inventors: Hironori Tsuchihashi, Sakai (JP);
Yoshikazu Togoshi, Sakai (JP);
Takafumi Komatsu, Sakai (JP); Akira Minoura, Sakai (JP); Kazuaki Nogami, Sakai (JP); Kazutomo Miyaguchi, Sakai (JP); Eiji Satou, Sakai (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/024,192

(22) Filed: Sep. 11, 2013

(65) Prior Publication Data
US 2014/0237973 A1 Aug. 28, 2014

(30) Foreign Application Priority Data

Feb. 26, 2013 (JP) ................................ 2013-036173

(51) Int. Cl.
*B60R 21/13* (2006.01)
*A01D 34/00* (2006.01)
*A01D 34/82* (2006.01)

(52) U.S. Cl.
CPC ............ *A01D 34/001* (2013.01); *A01D 34/828* (2013.01); *B60R 21/131* (2013.01)

(58) Field of Classification Search
CPC ...... B60R 21/13; B60R 21/131; A01D 3/001; A01D 34/828

USPC ......... 280/756; 296/190.03; 56/15.9, DIG. 22
See application file for complete search history.

(56) References Cited

U.S. PATENT DOCUMENTS

| 2,828,970 | A | * | 4/1958 | Ivey ............................... 280/756 |
| 3,583,518 | A | * | 6/1971 | Bichel et al. .................. 180/89.1 |
| 4,490,966 | A |   | 1/1985 | Kuhn et al. |
| 4,563,019 | A | * | 1/1986 | Kuhn et al. .................... 280/481 |
| 7,404,282 | B2 | * | 7/2008 | Samejima et al. ............. 56/14.9 |
| 8,016,320 | B2 | * | 9/2011 | Becker .......................... 280/756 |
| 8,277,528 | B2 | * | 10/2012 | Umemoto et al. ........... 55/385.3 |
| 8,403,363 | B2 | * | 3/2013 | Duenchel et al. ............. 280/756 |
| 2003/0015361 | A1 | * | 1/2003 | Bland ........................... 180/68.1 |
| 2006/0042214 | A1 | * | 3/2006 | Asahara et al. ................. 56/202 |
| 2011/0248488 | A1 |   | 10/2011 | Duenchel et al. |

FOREIGN PATENT DOCUMENTS

| DE | 202010004753 U1 | 8/2010 |
| EP | 1197399 A2 | 4/2002 |
| FR | 2620430 A1 | 3/1989 |

* cited by examiner

*Primary Examiner* — Paul N Dickson
*Assistant Examiner* — Robert A Coker
(74) *Attorney, Agent, or Firm* — The Webb Law Firm (57) ABSTRACT

A ride-on lawn mower includes a traveling vehicle body including an operator's seat, and a wheel post for supporting a steering wheel mounted forward of the operator's seat. The lawn mower further includes a mower apparatus connected to a front part of the traveling vehicle body, a roll-over protective structure mounted in a rear part of the operator's seat, and a front guard extending upward from the wheel post and forward of the steering wheel.

15 Claims, 10 Drawing Sheets

RIDE-ON LAWN MOWER

CROSS-REFERENCE TO RELATED APPLICATION

This application claims priority to Japanese Patent Application No. 2013-036173, filed Feb. 26, 2013, the disclosure of which is hereby incorporated in its entirety by reference.

TECHNICAL FILED OF INVENTION

The present invention relates to a ride-on lawn mower including a traveling vehicle body, and a mower apparatus connected to a front part of the traveling vehicle body.

RELATED ART

A conventional ride-on lawn mower is known from U.S. Pat. No. 4,490,966, for example. The conventional ride-on lawn mower includes a roll-over protective structure (ROPS) mounted rearward of an operator's seat, and a frame extending upward from a front end portion of an operator's section floor.

SUMMARY OF INVENTION

In order to provide a frame structure for securing a space having a predetermined area for the operator's seat when the ROPS is mounted rearward of the operator's seat and a front guard is mounted forward of the operator's seat, it is required to determine upward extending lengths of the ROPS and the front guard so that upper ends thereof are positioned at predetermined levels, respectively. In the above-described conventional construction, the front guard extends from the operator's section floor of the vehicle body to increase the upward extending length of the front guard.

In view of the above, it is desired to achieve a ride-on lawn mower including a frame structure for securing a space for an operator's section by a ROPS and a front guard and additionally providing a compact arrangement for the front guard.

A ride-on lawn mower according to the present invention includes a traveling vehicle body including an operator's seat, and a wheel post for supporting a steering wheel mounted forward of the operator's seat. The lawn mower further includes a mower apparatus connected to a front part of the traveling vehicle body, a roll-over protective structure mounted in a rear part of the operator's seat, and a front guard extending upward from the wheel post and forward of the steering wheel.

With the above-described arrangement, since upper ends of the front guard and the ROPS are positioned at predetermined levels, respectively, a fixed area of the space for the operator's section can be secured by the arrangement of the front guard and the ROPS.

Further, since the front guard extends from the wheel post, the upper end of the front guard can be positioned at the predetermined level while the reduced extending length of the front guard is achieved, compared with a front guard extending from the vehicle body. Thus, the front guard can be small having a reduced extending length and can be arranged close to the wheel post in a compact space.

Consequently, the present invention can provide the ride-on lawn mower that includes the frame structure for securing a fixed area of the space for the operator's section by the arrangement of the front guard and the ROPS, and that is easy to control in a mowing operation even in an area where a tree or trees are growing because the front guard can hardly be an obstacle.

It is preferable that the wheel post includes a pair of right and left legs projecting upward from the traveling vehicle body, a wheel support connected to upper portions of the right and left legs for supporting the steering wheel, and a bracket connected to the right and left legs with a lower end thereof being positioned downward of the wheel support.

With the above-described arrangement, since the wheel post has a box structure in which the pair of right and left legs, the wheel support and the bracket are connected together, the wheel post can be lightweight and yet stable enough for firmly supporting the front guard.

Therefore, the front guard can be firmly supported by the wheel post, which can achieve the lightweight frame structure for reliably securing the space for the operator's section.

It is preferable that the bracket includes a pair of right and left connecting elements put to and connected to side surfaces of the right and left legs, and a guard support connected to the right and left connecting elements for supporting the front guard, in which the right and left connecting elements each have a length in a vehicle vertical direction greater than a length of the guard support in the vehicle vertical direction.

With the above-described arrangement, while the bracket can be firmly connected to the legs of the wheel post through the right and left connecting elements each having a length in the vehicle vertical direction greater than the length of the guard support, the bracket can be lightweight with the vertical length smaller than the vertical length of the right and left connecting elements of the guard support.

Therefore, the lightweight front guard supporting structure can be achieved in which the bracket is firmly connected to the wheel post for stably supporting the front guard.

It is preferable that the front guard includes a pair of right and left vertical frame elements vertically extending from the wheel post, and at least one cross frame element extending in a vehicle transverse direction and connected to distal ends of the right and left vertical frame elements.

With the above-described arrangement, since the front guard can have a frame structure in which the pair of right and left vertical frame elements are connected to the cross frame element, the front guard can be lightweight and yet sufficiently solid.

Therefore, the front guard can be solid enough for guaranteeing the secure space for the operator's section, and yet lightweight.

It is preferable that the cross frame element is curved to project forward of the traveling vehicle body as viewed from the top.

With the above-described arrangement, the front guard is allowed to easily extend along the perimeter of the front cover for the wheel post due to the curved shape of the cross frame element, which achieves the compact arrangement of the front guard that is positioned close to the wheel post.

Therefore, the front guard is unlikely to become an obstacle when the vehicle body approaches a growing tree or trees.

It is preferable that the at least one cross frame element includes a plurality of cross frame elements arranged spaced from each other in the vehicle vertical direction, and each of the plurality of cross frame elements is formed of an inclined plate element with a flat surface thereof being positioned downward toward the front of the traveling vehicle body in a vehicle fore and aft direction.

With the above-described arrangement in which the pair of right and left vertical frame elements are connected to each other through the cross frame elements at plural positions in the vehicle vertical direction, the front guard can be provided with enough strength and the operator can look ahead through a gap defined between the cross frame elements.

As a result, while it is possible to provide the enough strength to the front guard to guarantee the secure space for the operator's section, the operator can look the mower apparatus or the front area through the gap between the cross frame elements and thus easily perform the operations.

It is preferable that the right and left vertical frame elements each have a first section fixed to the wheel post, a second section extending outward from the first section in the vehicle transverse direction, and a third section extending forward and upward to bulge. Further, it is preferable including a front cover for covering the wheel post, in which the front cover has an upper portion positioned rearward of an upper portion of the front guard, and a lower portion projecting forward from the front guard.

DETAILED DESCRIPTION OF INVENTION

Embodiments of the present invention will be described hereinafter in reference to the accompanying drawings.

Figure 1:
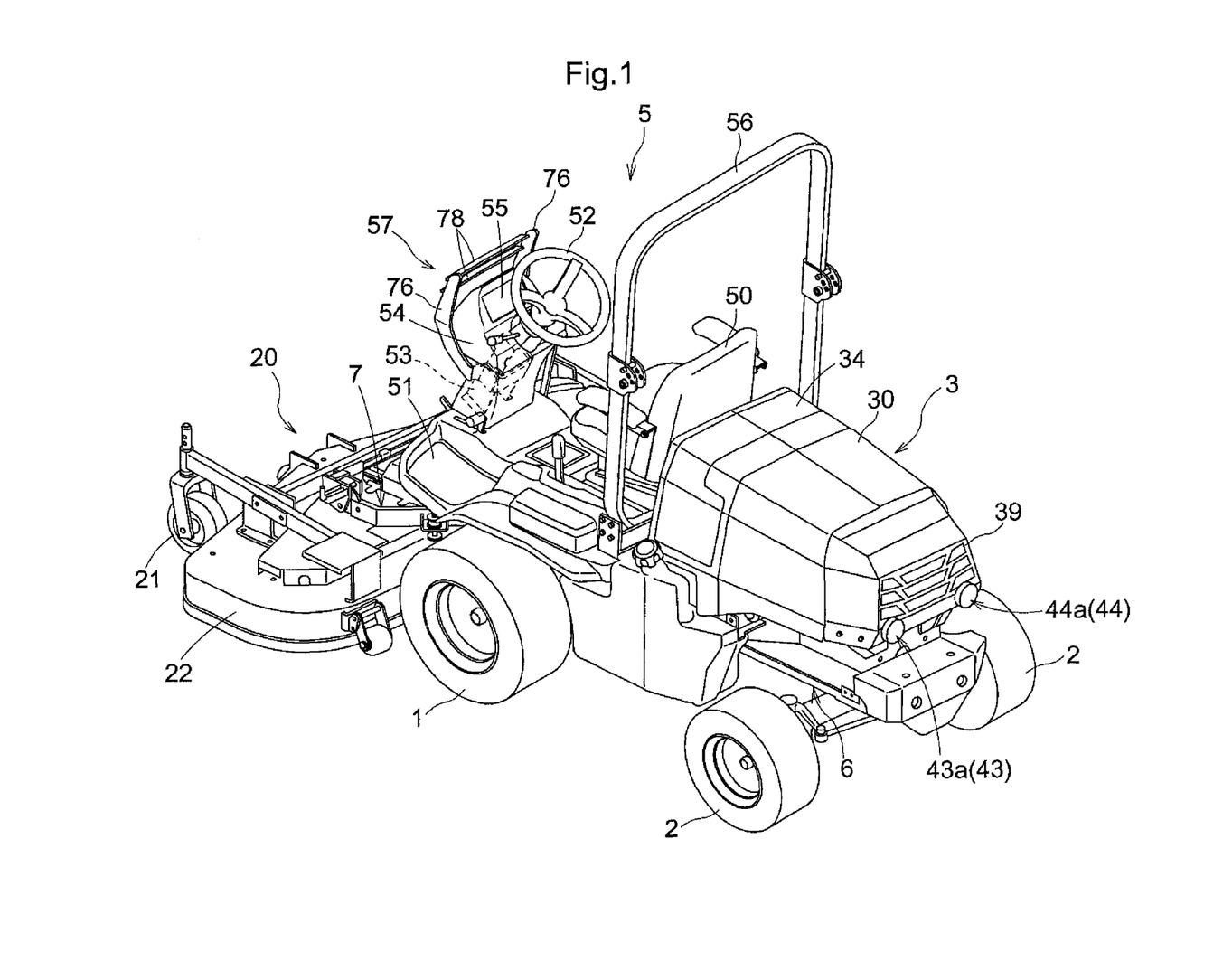
FIG. 1 is a perspective view of an entire ride-on lawn mower.
Figure 2:
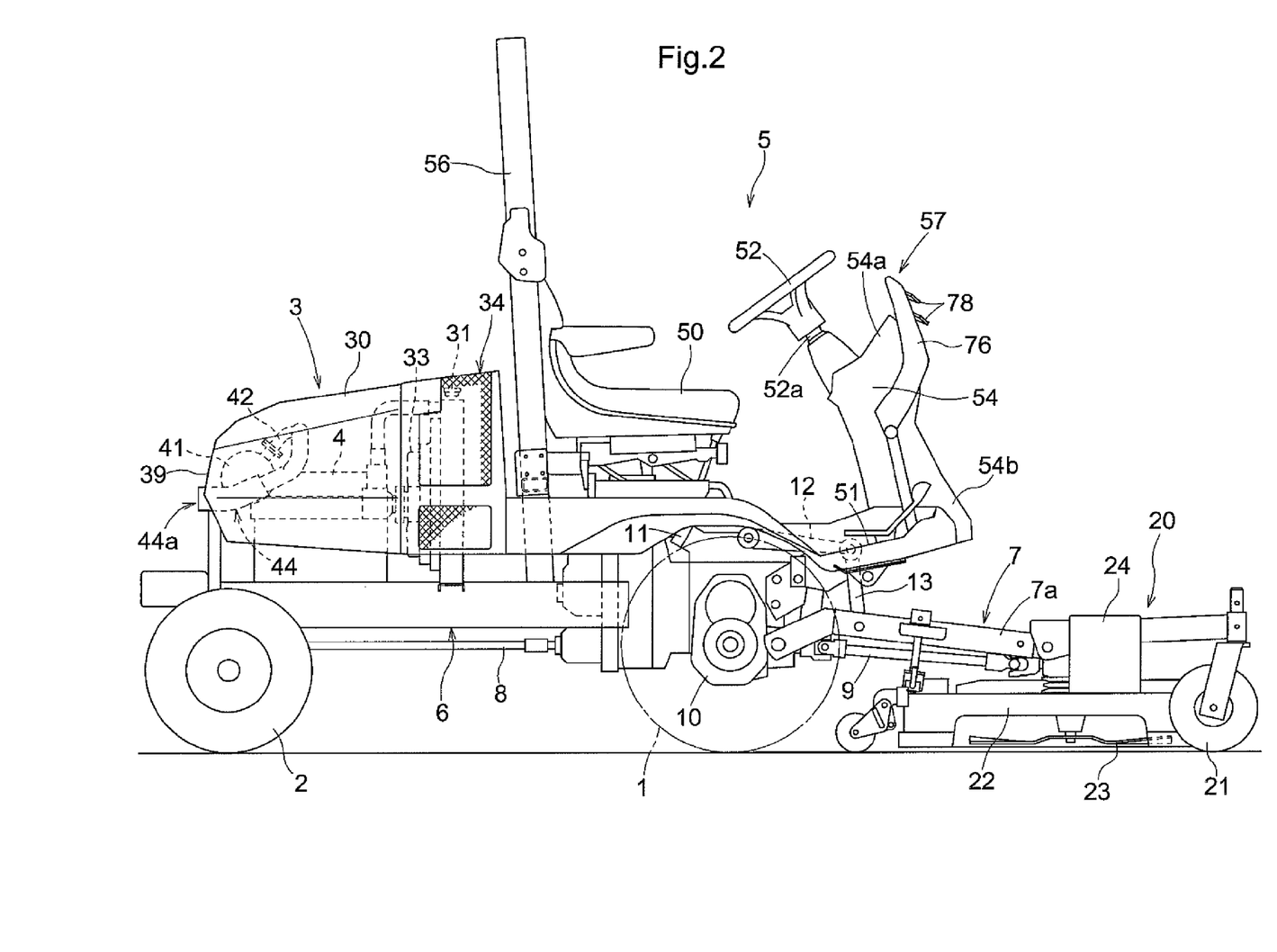
FIG. 2 is a side view of the entire ride-on lawn mower.
Figure 3:
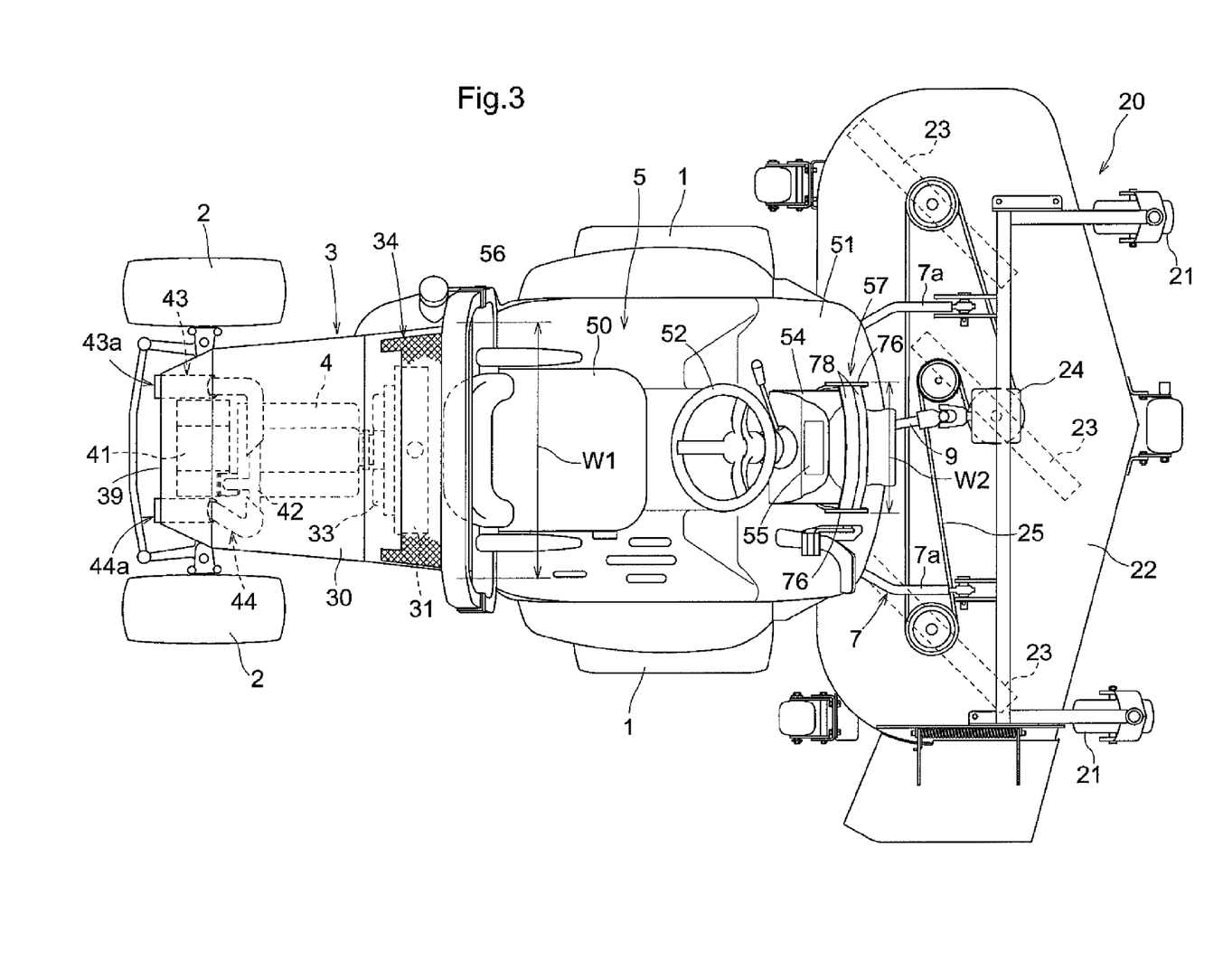
FIG. 3 is a top plan view of entire ride-on lawn mower.

FIG. 1 is a perspective view of an entire ride-on lawn mower according to the present invention. FIG. 2 is a side view of the entire ride-on lawn mower according to the present invention. FIG. 3 is a top plan view of the entire ride-on lawn mower according to the present invention. As shown in FIGS. 1 to 3, the ride-on lawn mower according to the present invention includes a pair of right and left front wheels 1, a pair of right and left steerable wheels 2, and a motor section 3 mounted rearward of a vehicle body. The pair of right and left front wheels 1 are driven by a driving force from an engine 4 mounted on the motor section 3 to allow self-propelling of the mower. The ride-on lawn mower further includes a traveling vehicle body configured to be controlled by an operator having climbed into an operator's section 5, and a mower apparatus 20 connected to a front part of a vehicle frame 6 of the traveling vehicle body through a vertically oscillatable link mechanism 7.

A main link 7a forming the link mechanism 7 is connected to a lift arm 12 through a lift link 13. The lift arm 12 is provided in a transmission case 10 forming the front part of the vehicle frame 6 through a lift cylinder 11 to be vertically osciallatable. The lift arm 12 is vertically oscillated by the lift cylinder 11 to vertically move the link mechanism 7. As a result, the mower apparatus 20 is vertically operated between a descended operational position in which a right and left pair of gauge wheels 21 come into contact with the ground and an ascended non-operational position in which the right and left pair of gauge wheels 21 are elevated from the ground.

The mower apparatus 20 includes a blade housing 22 connected at an upper surface thereof to the link mechanism 7, and three cutting blades 23 arranged in a vehicle transverse direction within the blade housing 22. Each of the cutting blades 23 is rotated about an axis extending vertically of the vehicle body by the driving force from the engine 4. The driving force from the engine 4 is transmitted to an input case 24 through the transmission case 10 and a rotary shaft 9, and then transmitted to each cutting blade from the input case 24 through a transmission belt 25.

Thus, the ride-on lawn mower allows the traveling vehicle body to travel with the mower apparatus 20 being in the descended operational position, and allows the mower apparatus 20 to mow lawn or grass at a cutting level determined by the gauge wheels 21.

The motor section 3 of the traveling vehicle body will be described next.

Figure 8:
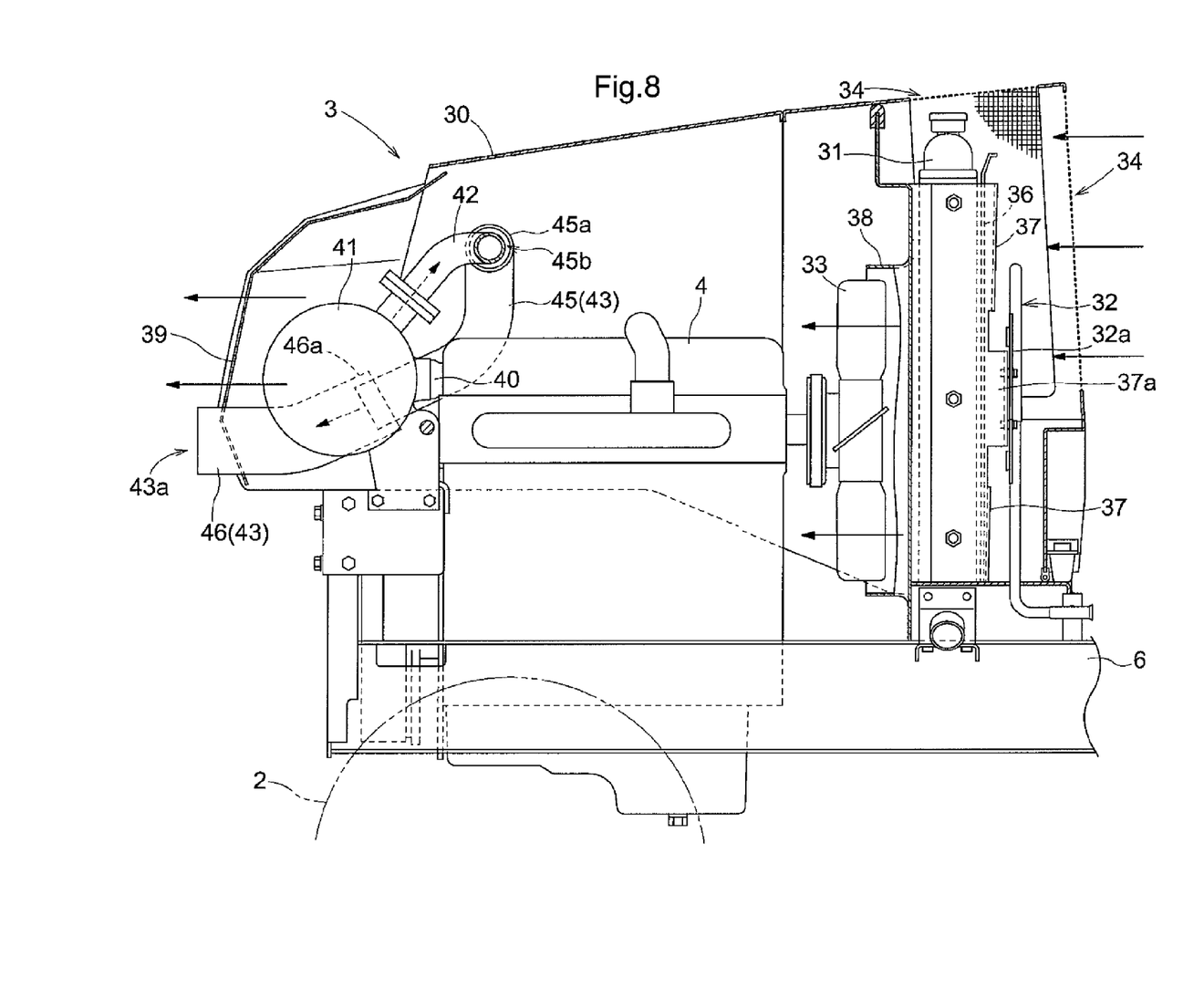
FIG. 8 is a side view of a motor section.
Figure 9:
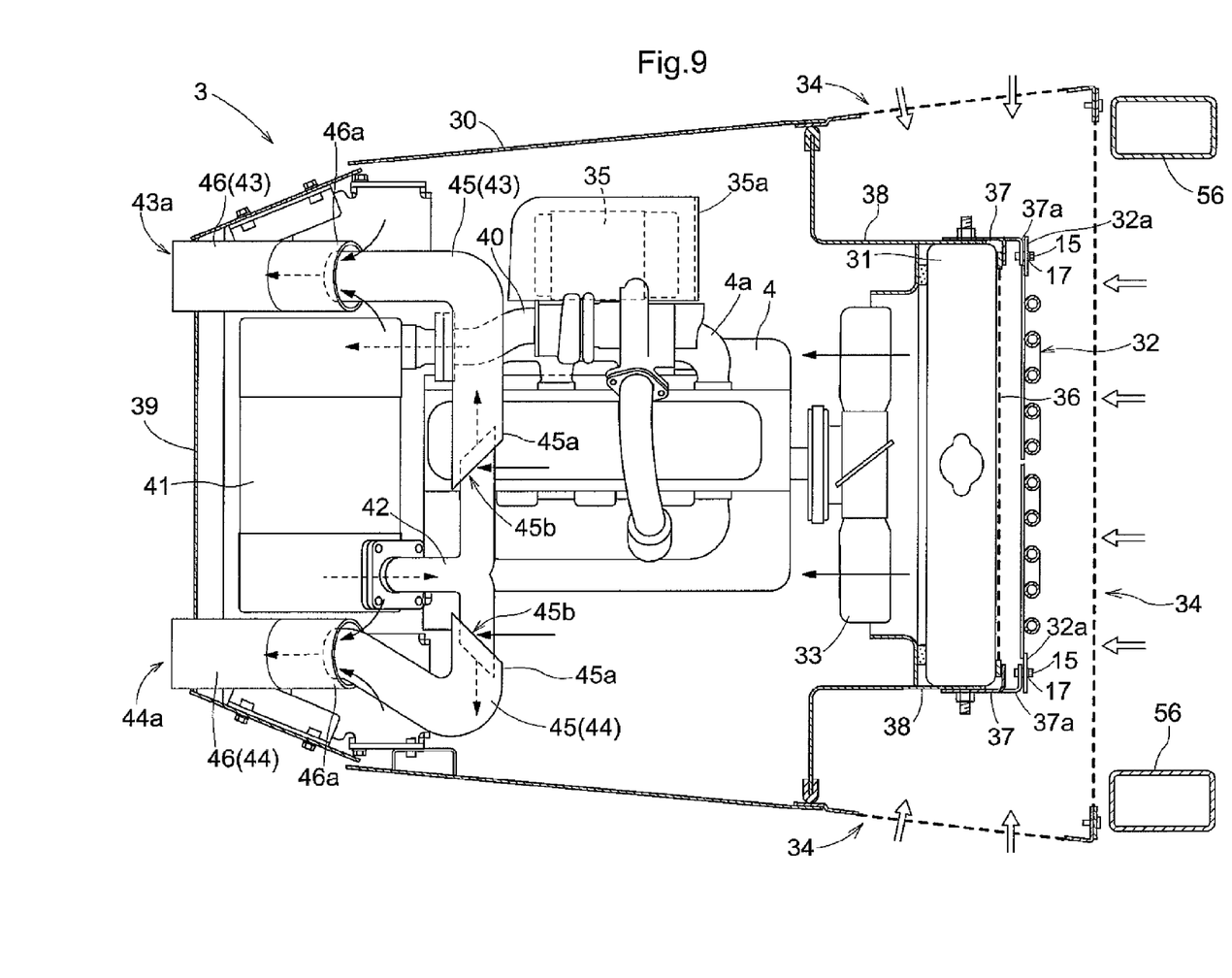
FIG. 9 is a top plan view of the motor section.
Figure 10:
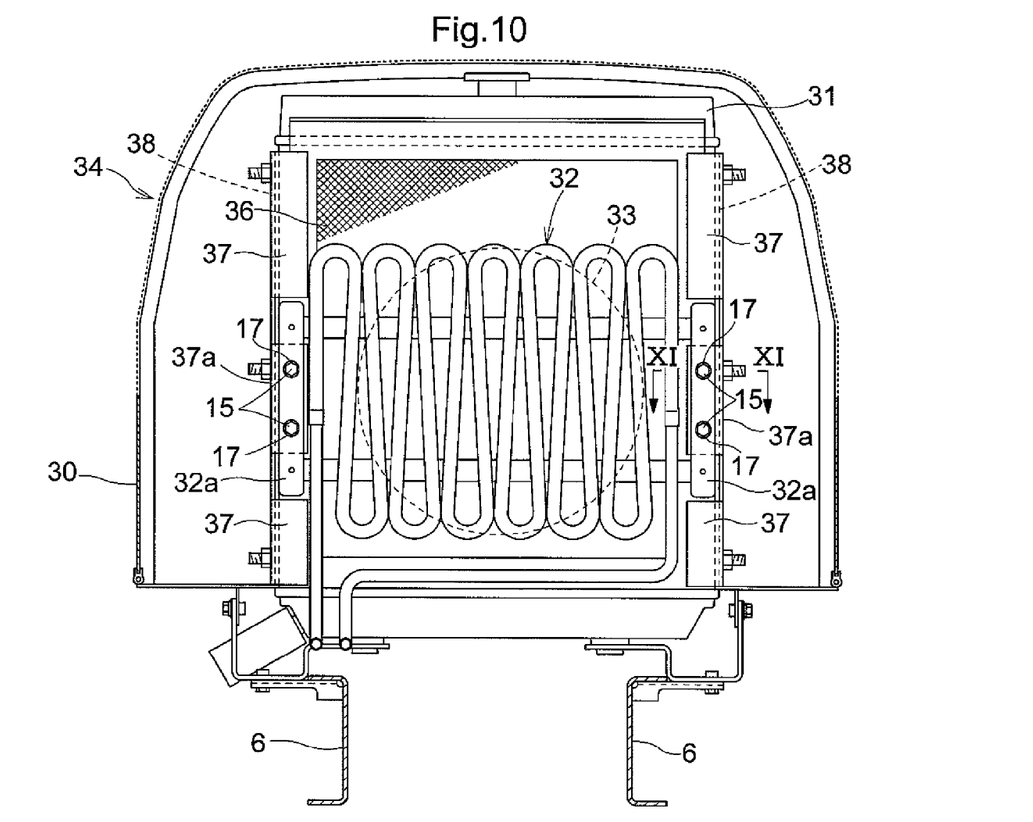
FIG. 10 is a front view of an attachment portion of a dust-proof net and an oil cooler.
Figure 11:
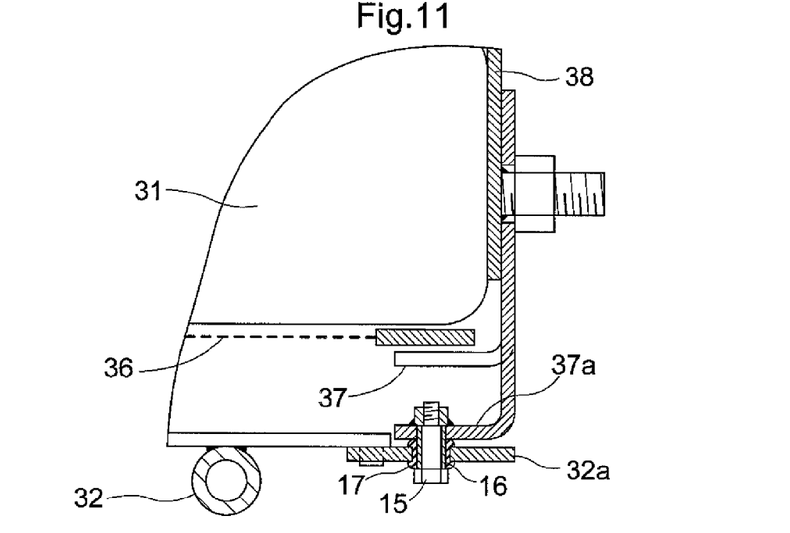
FIG. 11 is a portion of FIG. 10 as viewed from an arrow direction taken on line XI-XI in FIG. 10.

FIG. 8 is a side view of the motor section 3. FIG. 9 is a top plan view of the motor section 3. As shown in FIGS. 8 and 9, a radiator 31 for cooling the engine and an oil cooler 32 mounted on an air intake side of the radiator 31 are housed in an air intake area defined in a front end side of an engine hood 30. Cooling air is drawn to the air intake area from the outside of the engine hood 30 through an air intake window 34 provided in a front end portion of the engine hood 30 by the blowing action of a cooling fan 33 rotated by the engine 4. The cooling air is supplied to the oil cooler 32 and the radiator 31 to cool pressure oil and the engine 4. A heat shield panel 35a is provided to cover the front to the top of an engine starter 35 for preventing the cooling air heated by heat exchange at the radiator 31 from blowing against the engine starter 35. The heat shield panel 35a is supported by a supporting part provided laterally of the engine 4.

A dust-proof net 36 is provided between the radiator 31 and the oil cooler 32 at the air intake side of the radiator 31. As shown in FIGS. 8 to 11, the dust-proof net 36 is inserted into a pair of right and left guide rails 37 from above and detachably supported thereto. The guide rails 37 are distributed in lateral opposite sides of the radiator 31 to extend vertically of the vehicle body. The right and left guide rails 37 are supported to lateral end portions of a fan shroud 38 that are connected to the radiator 31.

Referring to FIGS. 8 to 11 again, an attachment plate 32a for the oil cooler 32 connected to a support 37a continued from the guide rail 37 through a connecting bolt 15. The connecting bolt 15 is a shoulder bolt. In order to prevent the attachment plate 32a from coming in tight contact with the support 37a, a collar 16 attached to the connecting bolt 15 and an annular cushion rubber element 17 disposed between the collar 16 and the attachment plate 32a serve to alleviate vibrations transmitted to the oil cooler 32.

Figure 12:
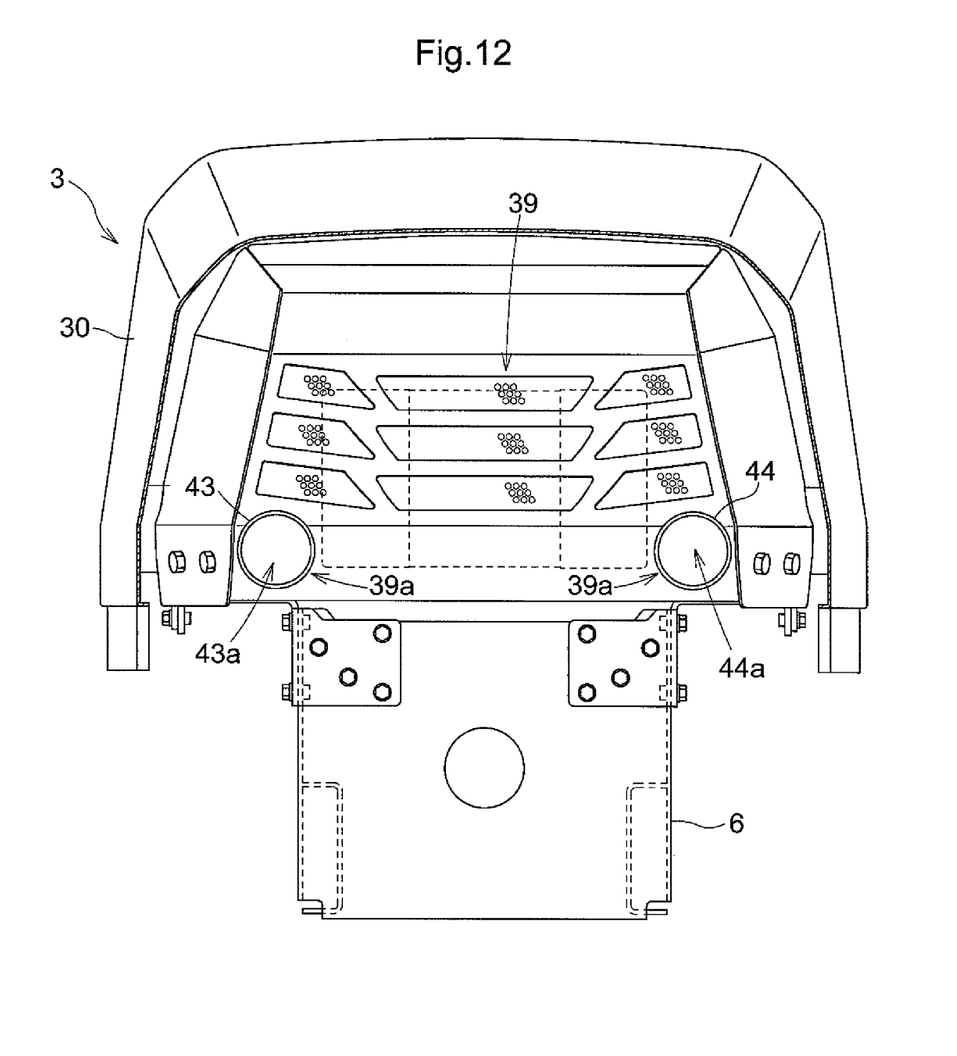
FIG. 12 is a rear view of the motor section.

As illustrated in FIGS. 8 and 9, an exhaust muffler 41 is mounted within the engine hood 30 in a rear end side thereof. An intake port of the exhaust muffler 41 is connected to an exhaust manifold 4a of the engine 4 through an exhaust guide pipe 40. A pair of right and left exhaust pipes 43 and 44 are connected to a discharge port of the exhaust muffler 41 through a distribution pipe 42. As shown in FIGS. 1, 9 and 12, an exhaust port 43a of the left exhaust pipe 43 is positioned at a left-side end portion of the rear part of the traveling vehicle body, while an exhaust port 44a of the right exhaust pipe 44 is positioned at a right-side end portion of the rear part of the traveling vehicle body. The exhaust ports 43a and 44a of the right and left exhaust pipes 43 and 44 are directed rearward of the traveling vehicle body from exhaust holes 39a formed in a grille 39 of the engine hood 30.

Therefore, the exhaust gas from the exhaust muffler 41 is divided to the pair of right and left exhaust pipes 43 and 44. Compared with a system for allowing the gas to flow collectively through a single exhaust pipe, effective cooling of the gas by heat exchange with the outside air of the exhaust pipes 43 and 44 can be performed for discharging the gas.

In reference to FIGS. 8 and 9, each of the right and left exhaust pipes 43 and 44 consists of an exhaust pipe section 45 provided upstream in an exhaust gas flowing direction and an exhaust pipe section 46 provided downstream in the exhaust gas flowing direction. The upstream exhaust pipe section 45 has an intake port 45a connected to the distribution pipe 42, and the downstream exhaust pipe section 46 has an intake port 46a fitted on a discharge end portion of the upstream exhaust pipe section 45. The intake port 45a of the upstream exhaust pipe section 45 is fitted on a discharge end portion of the distribution pipe 42 with a gap. The outside air of the exhaust pipes 43 and 44 is drawn into the interior of the pipes through the gaps between the distribution pipe 42 and the upstream exhaust pipe sections 45 by the suctioning action caused by the flow of the exhaust gas flowing into the upstream exhaust pipe sections 45 from the distribution pipe 42. The drawn air is mixed with the exhaust gas from the distribution pipe 42 to cool the exhaust gas. The intake port 46a of the downstream exhaust pipe section 46 is fitted on the discharge end portion of the upstream exhaust pipe section 45 with a gap. The outside air of the exhaust pipes 43 and 44 is drawn into the interior of the pipes through the gaps between the upstream exhaust pipe sections 45 and the downstream exhaust pipe sections 46 by the suctioning action caused by the flow of the exhaust gas flowing into the downstream exhaust pipe sections 46 from the upstream exhaust pipe sections 45. The drawn air is mixed with the exhaust gas from the upstream exhaust pipe sections 46 to cool the exhaust gas. The opening of the intake port 46a of the downstream exhaust pipe section 46 is oriented forward or upward of the traveling vehicle body to draw the outside air by the flow of the exhaust gas satisfactorily.

As illustrated in FIG. 9, a cut end of the intake port 45a of the upstream exhaust pipe section 45 is inclined with respect to the axis of the intake port 45a and with respect to a fore and aft direction of the traveling vehicle body so that an opening 45b of the intake port 45a of the upstream exhaust pipe section 45 is oriented forward of the traveling vehicle body. Thus, although the axis of the intake port 45a of the upstream exhaust pipe section 45 is perpendicular or generally perpendicular to the flowing direction of the outside air of the exhaust pipes 43 and 44 (rearward of the traveling vehicle body), the opening 45b can be oriented forward for easily taking in the outside air, thereby to introduce the outside air satisfactorily from the gaps between the distribution pipe 42 and the upstream exhaust pipe sections 45.

Therefore, the exhaust gas from the exhaust muffler 41 is divided into the right and left exhaust pipes 43 and 44 to cooling the air effectively. Additionally, since the exhaust gas is mixed with the outside air at the two positions of the right and left exhaust pipes 43 and 44, the exhaust gas from the engine 4 is effectively cooled and then discharged.

Next, the operator's section 5 of the traveling vehicle body will be described.

Figure 4:
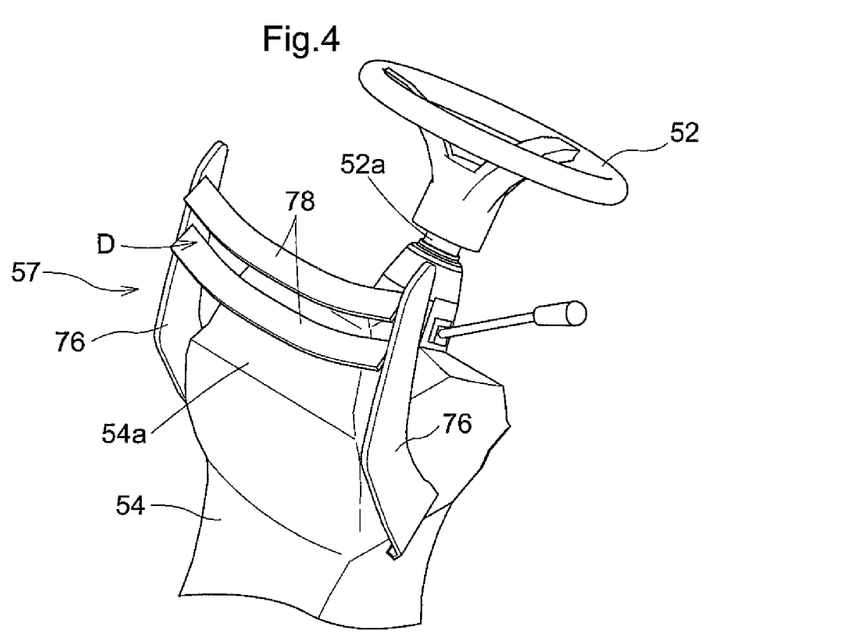
FIG. 4 is a perspective view of a front guard and a steering wheel.
Figure 5:
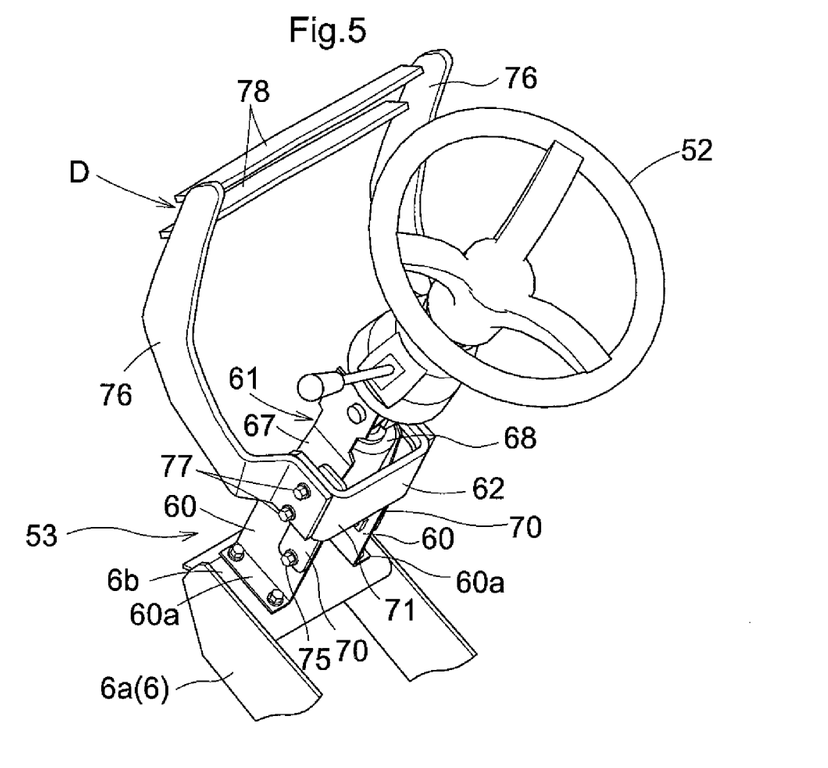
FIG. 5 is a perspective view of the front guard, the steering wheel and a wheel post.

Referring to FIGS. 1 to 3, the operator's section 5 includes an operator's seat 50 mounted forwardly of the motor section 3, an operator's section floor 51 provided forwardly and downwardly of the operator's seat 50, and a steering wheel 52 mounted forwardly of the operator's seat 50. As shown in FIG. 5, the steering wheel 52 is rotatably supported by a wheel post 53 projecting upward from a front end portion of the vehicle frame 6 in the vicinity of a front end of the operator's section floor 51. A front cover 54 is attached to the wheel post 53 as shown in FIGS. 1, 2 and 4. The front cover 54 is configured to cover the wheel post 53 from the front, the lateral opposite sides and the rear. An operation panel 55 having a display for displaying the operational conditions of the mower apparatus 20 and the engine 4, the remaining quantity of the fuel and the like is mounted in an upper portion of the front cover 54 (see FIG. 1). The front cover 54 is dividable into front and rear front cover sections.

As shown in FIGS. 1 to 3, a roll-over protective structure (ROPS) 56 extends upward from the vehicle frame 6 in a rear part of the operator's seat 50, and a front guard 57 is provided in the operator's section 5. The front guard 57 extends upward from the wheel post 53 and forwardly of the steering wheel 52 through the front cover 54. The ROPS 56 and the front guard 57 constitute a frame structure for securing a space for the operator's section 5 when the vehicle rolls over.

Referring to FIGS. 1 and 3, the ROPS 56 has an arched shape as viewed from the front or the rear of the traveling vehicle body. The ROPS 56 has an upper end width W1 greater than an upper end width W2 of the front guard 57 in the vehicle transverse direction. Consequently, the ROPS 56 and the front guard 57 provide a structure for securing a trapezoidal space in which the rear side of the vehicle body is greater than the front side of the vehicle body as viewed from the top.

Next, the wheel post 53 will be described.

Figure 6:
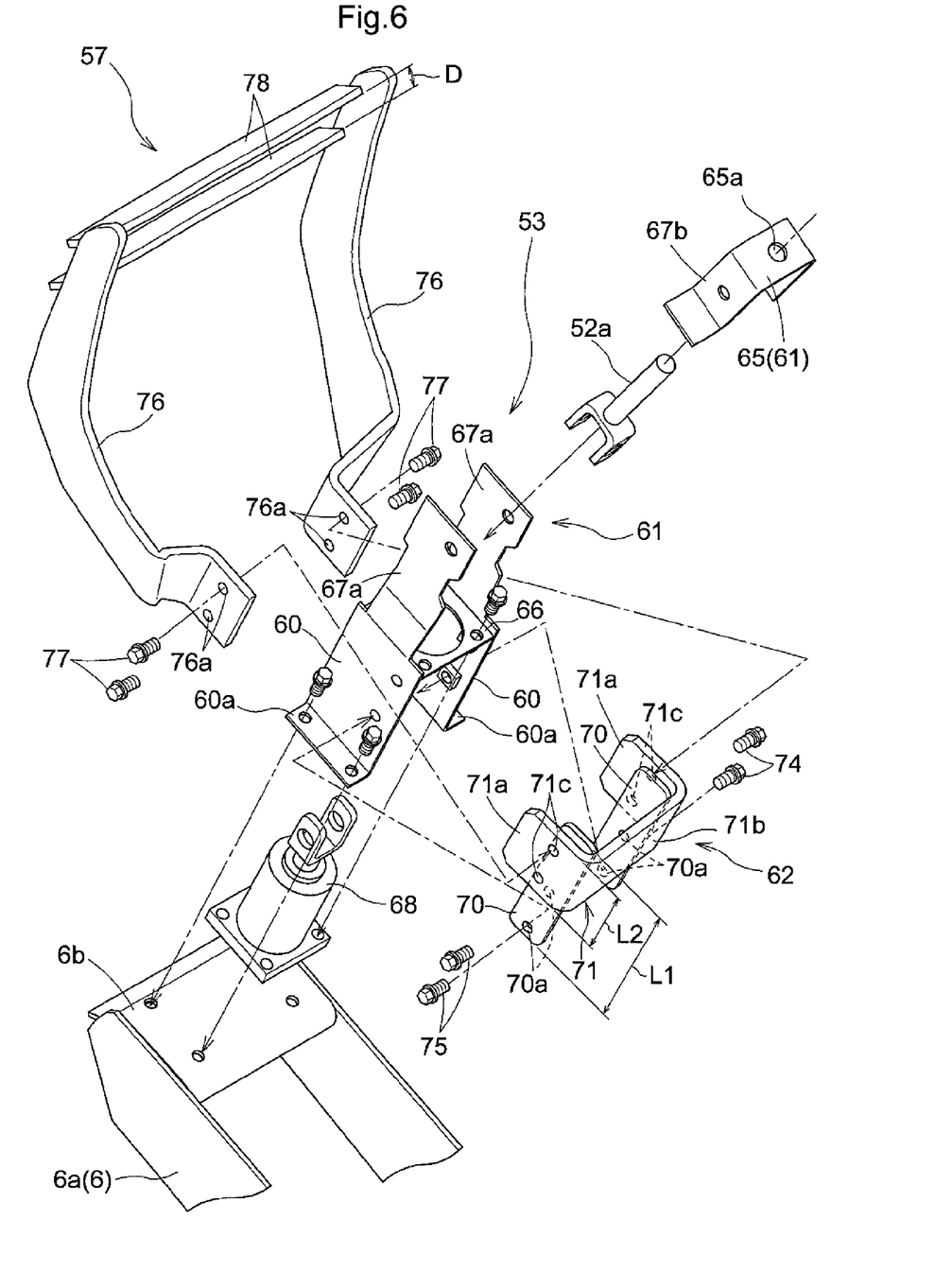
FIG. 6 is an exploded perspective view of the front guard and the steering post.
Figure 7:
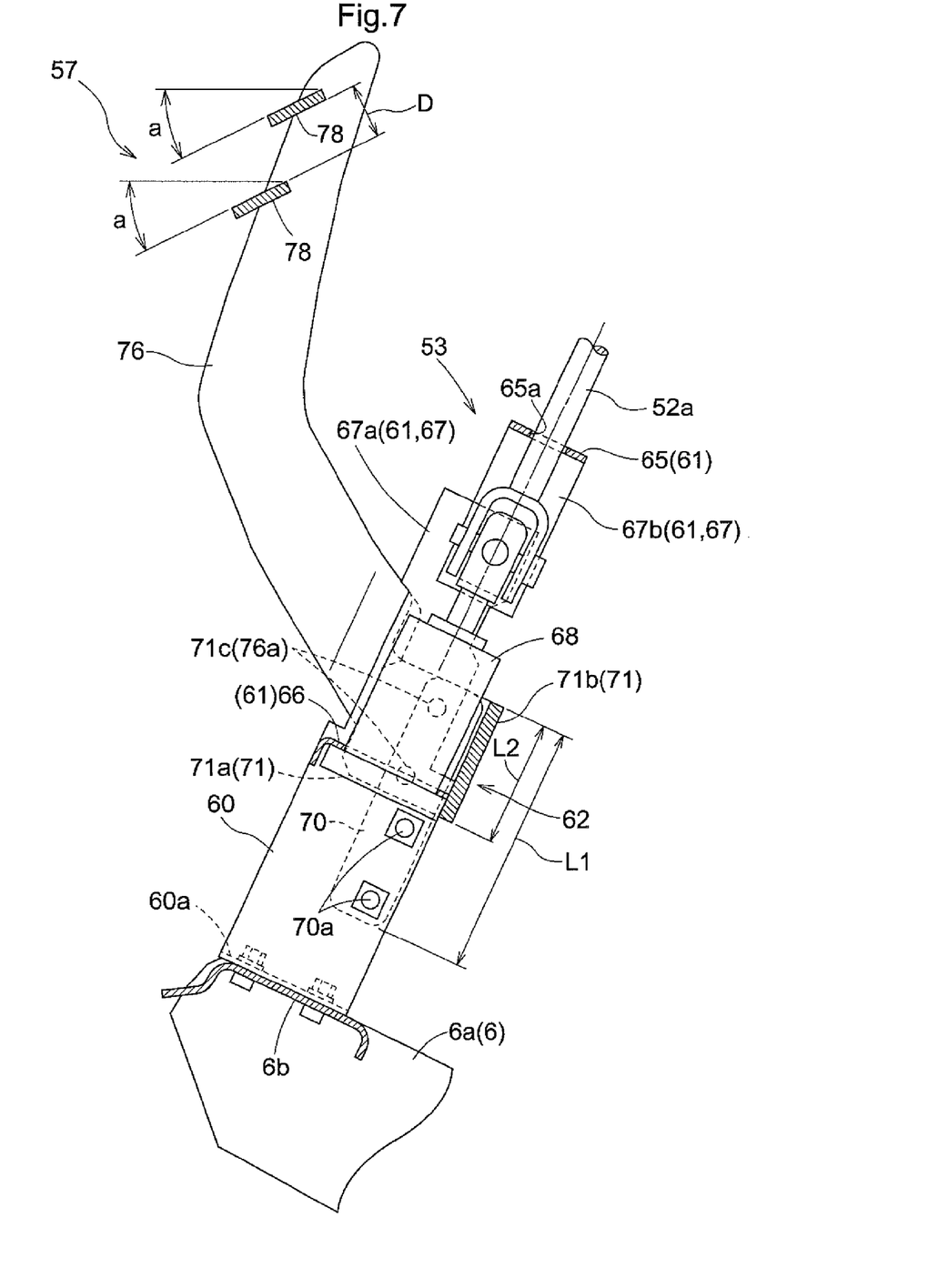
FIG. 7 is a vertical sectional view of the wheel post.

In reference to FIGS. 5 to 7, the wheel post 53 includes a pair of right and left legs 60 projecting upward from a cross plate 6b provided in an operator's section frame 6a of the vehicle frame 6, a wheel support 61 connected to upper portions of the pair of right and left legs 60 for rotatably supporting the steering wheel 52, and a bracket 62 connected to the pair of right and left legs 60 for supporting the front guard 57.

Each of the right and left legs 60 is formed of a vertically extending plate having a bent end 60a at a lower end thereof. The leg is fixed to the cross plate 6b of the operator's section frame 6a at the bent end 60a through connecting bolts.

The wheel support 61 includes an upper cross plate element 65 having a through bore 65a through which a wheel shaft 52a (see FIGS. 4, 6 and 7) extends, a lower cross plate element 66 provided downward of the upper cross plate element 65 at a predetermined interval, and a pair of right and left vertical plate elements 67 for connecting the upper cross plate element 65 and the lower cross plate element 66 at their side end portions. The wheel support 61 is connected to the right and left legs 60 with a lower end portion thereof where the lower cross plate element 66 is positioned being connected to the upper portions of the right and left legs 60. The right and left vertical plate elements 67 have lower vertical plate elements 67a integrally formed with upper ends of the legs 60, and upper vertical plate elements 67b integrally formed with the upper cross plate element 65 at upper ends thereof. The upper vertical plate elements 67b are connected to upper ends of the lower vertical plate elements 67a. The angle of each of the upper vertical plate elements 67b is variable in the fore and aft direction of the traveling vehicle body, thereby to adjust the position of the steering wheel 52 in the fore and aft direction. A steering valve 68 is fixed to the lower cross plate element 66, thereby to allow the wheel support 61 to support the steering wheel 52 to be rotatably operable through the steering valve 68 and the wheel shaft 52a. The steering valve 68 is operated as the steering wheel 52 is rotated and is configured to control a power steering cylinder (not shown) associated with knuckle arms (not shown) of the right and left rear wheels 2.

The bracket 62 is formed of a pair of right and left connecting elements 70 that are vertical plates, and a guard support 71 connected to the right and left connecting elements 70. The guard support 71 has a pair of right and left side vertical plate portions 71a provided in the outside of the lateral sides of the right and left connecting elements 70, and a central vertical plate portion 71b connected to the right and left side vertical plate portions 71a and the right and left connecting elements 70. Each of the right and left connecting elements 70 has a vertical length L1 greater than a vertical length L2 of the guard support 71. The right and left connecting elements 70 and the guard support 71 are connected to each other so that lower ends of the right and left connecting elements 70 project downward from the guard support 71. Bolt bores 70a are formed in portions of the right and left connecting elements 70 projecting downward from the guard support 71 for connecting the connecting elements 70 to the legs 60. Further, bolt bores 71c are formed in the right and left side vertical plate portions 71a for connecting the side vertical plate portions 71a to the front guard 57.

While the left connecting element 70 is put to an outer side surface of the left leg 60 to be fastened through connecting bolts 75, the right connecting element 70 is put to an outer side surface of the right leg 60 to be fastened through connecting bolts 74, as a result of which the bracket 62 is connected to the right and left legs 60. The bracket 62 and the legs 60 are connected to each other so that the lower ends of the connecting elements 70 and the lower end of the guard support 71 of the bracket 62 are positioned downward of the wheel support 61. More particularly, the bracket 62 is connected to the right and left legs 60 so that the lower ends of the connecting elements 70 and the lower end of the guard support 71 of the bracket 62 are positioned downward of the lower cross plate element 66 of the wheel support 61. The bracket 62 is configured to support the front guard 57 by fastening lower portions of vertical frame elements 76 of the front guard 57 to the right and left side vertical plate portions 71a through connecting bolts 77. The front guard 57 is fixed to the wheel post 53 in the above-described manner.

The front guard 57 will be described next.

Referring to FIGS. 4 to 7, the front guard 57 has a frame structure including the pair of right and left vertical frame elements 76 extending upward from the right and left side vertical plate portions 71a of the bracket 62 of the wheel post 53, and a pair of upper and lower cross frame elements 78 extending in the vehicle transverse direction and connected to distal ends of the right and left vertical frame elements 76.

As shown in FIGS. 2 and 4, the front guard 57 is positioned close to the front cover 54 to achieve a compact arrangement.

More particularly, the front guard 57 has an upper portion positioned above an upper portion 54a of the front cover 54. Further, the upper portion 54a of the front cover 54 is positioned rearward of the upper portion of the front guard 57, and a lower portion 54b of the front cover 54 projects forward of the front guard 57. The right and left frame elements 76 constituting the front guard 57 are positioned at lateral sides of the upper portion 54a of the front cover 54.

Referring to FIGS. 1 and 4, the upper portion of the vertical frame elements 76 and the cross frame elements 78 are positioned in the upper side and the lateral sides of the front cover 54 so that the front guard 57 serves to protect the display section including the operation panel 55.

The pair of cross frame elements 78 are vertically arranged with a gap D to allow the operator to look ahead from the operator's section 5 through the gap D. Each of the cross frame elements 78 is inclined downward and forward as viewed from the side to provide good front visibility. An angle of downward and forward inclination a of each of the cross frame elements 78 (see FIG. 7) is preferably 20 to 30 degrees, and more preferably 24 to 28 degrees.

The pair of upper and lower cross frame elements 78 are curved to project forward of the traveling vehicle body as viewed from the top to allow the front guard 57 to be arranged with its lateral opposite end portions extending around the lateral sides of the front cover 54.

ALTERNATIVE EMBODIMENTS (1) In the above-described embodiment, the front guard 57 has the frame structure having the vertical frame elements 76 and the cross frame elements 78. Instead, a single unit as a whole may be employed for the front guard.

(2) In the above-described embodiment, the front guard 57 includes the pair of upper and lower cross frame elements 78. Instead, three or more cross frame elements or a single cross frame element having a wide vertical dimension may be provided.

The present invention is applicable not only to the mower apparatus 20 having three cutting blades 23 but also to a ride-on lawn mower provided with a mower apparatus having two or four or more cutting blades 23.

What is claimed is:

1. A ride-on lawn mower comprising:
   a traveling vehicle body including an operator's seat, and a wheel post for supporting a steering wheel mounted forward of the operator's seat;
   a mower apparatus connected to a front part of the traveling vehicle body;
   a roll-over protective structure mounted in a rear part of the operator's seat; and
   a front guard provided on the wheel post and extending upward from the wheel post and forward of the steering wheel.

2. The ride-on lawn mower according to claim 1, wherein the front guard includes a pair of right and left vertical frame elements vertically extending from the wheel post, and at least one cross frame element extending in a vehicle transverse direction and connected to distal ends of the right and left vertical frame elements.

3. The ride-on lawn mower according to claim 2, wherein the at least one cross frame element is curved to project forward of the traveling vehicle body as viewed from the top.

4. The ride-on lawn mower according to claim 2, wherein the at least one cross frame element comprises a plurality of cross frame elements arranged spaced from each other in the vehicle vertical direction.

5. The ride-on lawn mower according to claim 4, wherein each of the plurality of cross frame elements is formed of an inclined plate element with a flat surface thereof being positioned downward toward the front of the traveling vehicle body in a vehicle fore and aft direction.

6. The ride-on lawn mower according to claim 2, wherein the right and left vertical frame elements each have a first section fixed to the wheel post, a second section extending outward from the first section in the vehicle transverse direction, and a third section extending forward and upward to bulge.

7. The ride-on lawn mower according to claim 1, further comprising a front cover for covering the wheel post, wherein the front cover has an upper portion positioned rearward of an upper portion of the front guard, and a lower portion projecting forward from the front guard.

8. A ride-on lawn mower comprising:
a traveling vehicle body including an operator's seat, and a wheel post for supporting a steering wheel mounted forward of the operator's seat, the wheel post including a pair of right and left legs projecting upward from the traveling vehicle body, a wheel support connected to upper portions of the right and left legs for supporting the steering wheel, and a bracket connected to the right and left legs with a lower end thereof being positioned downward of the wheel support;
a mower apparatus connected to a front part of the traveling vehicle body;
a roll-over protective structure mounted in a rear part of the operator's seat; and
a front guard supported by the bracket, the front guard extending upward from the wheel post and forward of the steering wheel.

9. The ride-on lawn mower according to claim 8, wherein the bracket includes a pair of right and left connecting elements connected to side surfaces of the right and left legs, and a guard support connected to the right and left connecting elements for supporting the front guard, and
wherein the right and left connecting elements each have a length in a vehicle vertical direction greater than a length of the guard support in the vehicle vertical direction.

10. The ride-on lawn mower according to claim 8, wherein the front guard includes a pair of right and left vertical frame elements vertically extending from the wheel post, and at least one cross frame element extending in a vehicle transverse direction and connected to distal ends of the right and left vertical frame elements.

11. The ride-on lawn mower according to claim 10, wherein the at least one cross frame element is curved to project forward of the traveling vehicle body as viewed from the top.

12. The ride-on lawn mower according to claim 10, wherein the at least one cross frame element comprises a plurality of cross frame elements arranged spaced from each other in the vehicle vertical direction.

13. The ride-on lawn mower according to claim 12, wherein each of the plurality of cross frame elements is formed of an inclined plate element with a flat surface thereof being positioned downward toward the front of the traveling vehicle body in a vehicle fore and aft direction.

14. The ride-on lawn mower according to claim 10, wherein the right and left vertical frame elements each have a first section fixed to the wheel post, a second section extending outward from the first section in the vehicle transverse direction, and a third section extending forward and upward to bulge.

15. The ride-on lawn mower according to claim 8, further comprising a front cover for covering the wheel post, wherein the front cover has an upper portion positioned rearward of an upper portion of the front guard, and a lower portion projecting forward from the front guard.

* * * * *